United States Patent
Hellberg et al.

(10) Patent No.: US 9,228,089 B2
(45) Date of Patent: Jan. 5, 2016

(54) POLYESTER POLYAMINE AND POLYESTER POLYQUATERNARY AMMONIUM CORROSION INHIBITORS

(75) Inventors: Per-Erik Hellberg, Svenshogen (SE); Natalija Gorochovceva, Hjälteby (SE)

(73) Assignee: AKZO NOBEL CHEMICALS INTERNATIONAL B.V., Amersfoort (NL)

( * ) Notice: Subject to any disclaimer, the term of this patent is extended or adjusted under 35 U.S.C. 154(b) by 196 days.

(21) Appl. No.: 13/976,585

(22) PCT Filed: Dec. 23, 2011

(86) PCT No.: PCT/EP2011/073922
§ 371 (c)(1),
(2), (4) Date: Jun. 27, 2013

(87) PCT Pub. No.: WO2012/089649
PCT Pub. Date: Jul. 5, 2012

(65) Prior Publication Data
US 2013/0274492 A1    Oct. 17, 2013

Related U.S. Application Data

(60) Provisional application No. 61/427,539, filed on Dec. 28, 2010.

(30) Foreign Application Priority Data

Dec. 28, 2010    (EP) ..................................... 10197172

(51) Int. Cl.
| | | |
|---|---|---|
| *C07C 59/185* | (2006.01) | |
| *C09D 5/08* | (2006.01) | |
| *C09K 8/54* | (2006.01) | |
| *C10G 75/02* | (2006.01) | |
| *C10L 1/22* | (2006.01) | |
| *C10L 10/04* | (2006.01) | |
| *C10M 159/12* | (2006.01) | |
| *C23F 11/14* | (2006.01) | |
| *C23F 11/173* | (2006.01) | |
| *C10L 1/222* | (2006.01) | |
| *C10L 1/2387* | (2006.01) | |

(52) U.S. Cl.
CPC . *C09D 5/086* (2013.01); *C09K 8/54* (2013.01); *C10G 75/02* (2013.01); *C10L 1/221* (2013.01); *C10L 1/2222* (2013.01); *C10L 1/2225* (2013.01); *C10L 1/2387* (2013.01); *C10L 10/04* (2013.01); *C10M 159/12* (2013.01); *C23F 11/14* (2013.01); *C23F 11/173* (2013.01); *C02F 2303/08* (2013.01); *C10G 2300/1011* (2013.01); *C10G 2300/4075* (2013.01); *C10M 2215/082* (2013.01); *C10N 2230/12* (2013.01)

(58) Field of Classification Search
CPC ............ C09D 5/08; C09K 8/54; C10G 75/02; C10L 1/221; C10L 1/2222; C10L 1/2225; C10L 1/2387; C10L 10/04; C10M 159/12; C23F 11/14; C23F 11/173
USPC .......................................................... 554/107
See application file for complete search history.

(56) References Cited

U.S. PATENT DOCUMENTS 2,902,499 A * 9/1959 Gottshall et al. ............... 560/127
2,975,133 A * 3/1961 Gottshall et al. ............... 508/239
(Continued)

FOREIGN PATENT DOCUMENTS

EP    0 035 263 A2    9/1981
EP    0 333 135 A2    9/1989
(Continued)

OTHER PUBLICATIONS

European Search Report for corresponding EP Application No. 10197172.9; Completion date May 18, 2011.
(Continued)

*Primary Examiner* — Deborah D Carr
(74) *Attorney, Agent, or Firm* — Matthew D. Kellam

(57) ABSTRACT

The present invention relates to the use of a product obtainable by the reaction of a fatty acid, or mixture of acids, having the formula $R^1COOH$ (I); and a dicarboxylic acid or a derivative thereof having the formula (IIa) or (IIb) with an alkoxylated fatty amine having the formula (III) or a partial or wholly quaternized derivative thereof; optionally said reaction between the fatty acid, the dicarboxylic acid and the alkoxylated fatty amine is being followed by a further reaction step wherein part or all of the nitrogen atoms are quaternized by reaction with an alkylating agent $R^5X$; as a corrosion inhibitor for metal surfaces. The present invention also relates to such products and to methods for their production.

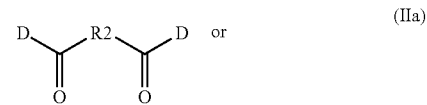
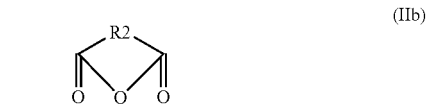
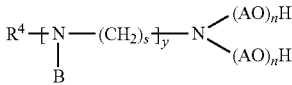 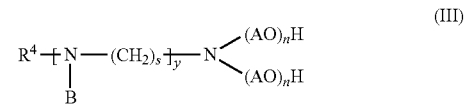

28 Claims, No Drawings

(56) References Cited

U.S. PATENT DOCUMENTS

| | | | |
|---|---|---|---|
| 3,014,864 | A | 12/1961 | Hughes et al. |
| 4,560,497 | A | 12/1985 | Staker et al. |
| 4,730,079 | A | 3/1988 | Hofinger et al. |
| 4,781,730 | A | 11/1988 | Stoldt et al. |
| 4,885,111 | A | 12/1989 | Bose et al. |
| 5,034,444 | A | 7/1991 | Yun et al. |
| 5,178,786 | A | 1/1993 | Jahnke et al. |
| 5,284,495 | A | 2/1994 | Baillargeon et al. |
| 5,352,377 | A | 10/1994 | Blain et al. |
| 5,385,674 | A | 1/1995 | Kupfer et al. |
| 5,440,060 | A | 8/1995 | Uhrig et al. |
| 5,456,731 | A | 10/1995 | Blain et al. |
| 5,710,110 | A | 1/1998 | Cooperman et al. |
| 5,871,049 | A | 2/1999 | Weaver et al. |
| 6,432,895 | B1 | 8/2002 | Bigorra et al. |

FOREIGN PATENT DOCUMENTS

| | | | |
|---|---|---|---|
| EP | 0 572 881 | B1 | 12/1993 |
| EP | 0 585 812 | A2 | 3/1994 |
| EP | 0 846 193 | B1 | 6/1998 |
| EP | 846193 | B1 * | 6/2001 |
| EP | 1 949 963 | A1 | 7/2008 |

OTHER PUBLICATIONS

International Search Report and Written Opinion for corresponding PCT Application No. PCT/EP2011/073922; Completion date Apr. 12, 2012.

English Translation of European Application No. 0 035 263.

English Translation of European Application No. 0 333 135.

* cited by examiner

POLYESTER POLYAMINE AND POLYESTER POLYQUATERNARY AMMONIUM CORROSION INHIBITORS

This application is a National Stage entry of International Application PCT/EP2011/073922, filed Dec. 23, 2011, which claims the benefit of U.S. Patent Application No. 61/427,539, filed Dec. 28, 2010, and European Patent Application No. 10197172.9, filed Dec. 28, 2010. The contents of the aforementioned applications are incorporated herein by reference in their entireties.

TECHNICAL FIELD OF INVENTION

The present invention relates to the use of a polyesteramine or a polyester polyquaternary ammonium compound as a corrosion inhibitor for metal surfaces, and to a method for protecting a metal surface from corrosion by contacting the metal surface with said corrosion inhibitor. The present invention further relates to the polyesteramine or polyester polyquaternary ammonium compounds as such, and to methods for their production.

TECHNICAL BACKGROUND OF THE INVENTION

Corrosion is often a serious issue in the oil and gas field processes, e.g. in transportation of crude oil, and in oil or gas wells. This could be due to dissolved gases such as carbon dioxide or hydrogen sulphide causing so-called sweet and sour corrosion, respectively, on ferrous metal surfaces. Another serious corrosion-enhancer is the often high electrolyte concentrations in the water which is co-produced with the oil and gas. Further, severe risks of corrosion are obvious when inorganic or organic acids are used in so-called acid stimulation or fracturing operations encountered in order to increase the productivity of oil and gas wells. Also in drilling operations there often is a need to use corrosion inhibitors, e.g. in drilling fluids. Corrosion problems are also often an issue in downstream processes, such as refineries, when e.g. salts or acid components from crude oils being processed are causing corrosion of ferrous metal.

Different types of nitrogen-containing compounds, as e.g. fatty amines, alkoxylated fatty amines, amidoamines and quaternary ammonium compounds are well-known bases for corrosion inhibitor formulations used in various kinds of systems.

U.S. Pat. No. 5,352,377 and U.S. Pat. No. 5,456,731, for example, disclose reaction products of hydrocarbyl substituted carboxylic anhydrides, more specifically hydrocarbyl substituted succinic anhydrides, and aminoalkanols, e.g. ethoxylated fatty alkyl monoamines or ethoxylated fatty alkyl propylenediamines, that can provide effective antiwear, antirust, and corrosion-inhibiting properties in lubricant and fuel applications.

U.S. Pat. No. 5,178,786 relates to corrosion-inhibiting compositions and their use in functional fluids, especially aqueous hydraulic fluids. These compositions comprises at least four components A, B, C and D, where component D is an ester-salt formed by the reaction of an alkyl or alkenyl succinic anhydride with an alkanolamine. The preferred alkanolamines are e.g. dimethylethanolamine, diethylethanolamine and methylethylethanolamine.

There is also a number of patent publications where oligomeric/polymeric nitrogen-containing ester-linked compounds based on dicarboxylic acids/anhydrides and ethoxylated (fatty alkyl)amines are used in other applications/systems. For example, in EP 0 572 881 a product obtained from an oxyalkylated primary fatty amine and a dicarboxylic acid is disclosed for the use in a process for separation of a petroleum emulsion of the water-in-oil type. U.S. Pat. No. 4,781,730 discloses reaction products of a polybasic acid and a polyhydroxyalkanolamine that are components in a fuel additive composition for reduction of valve seat recession in a vehicle. U.S. Pat. No. 5,034,444 discloses a rheological additive for non-aqueous coating compositions that may be the reaction product of an alkoxylated aliphatic nitrogen-containing compound and an organic polycarboxylic anhydride or acid. EP 0 035 263 A2 discloses polyester compounds produced by reaction between a dicarboxylic acid and an alkoxylated tertiary amine and their use as textile softeners. U.S. Pat. No. 5,284,495 discloses oligomers/polymers, which can be prepared by polymerising an anhydride, e.g. phthalic anhydride, and long-chain amine containing diols, e.g. ethoxylated octadecylamine. These products are used as additives which improve the low-temperature properties of distillate fuels. U.S. Pat. No. 5,710,110 discloses a drilling fluid composition containing an oil well fluid anti-settling additive, which is a reaction product wherein the reactants are one or more alkoxylated aliphatic amino compounds and an organic polycarboxylic anhydride or acid.

U.S. Pat. No. 6,432,895 and EP 1 949 963 A1 relate to products that are alkanolamine esters based on esterification reactions of optionally alkoxylated alkanolamines, dicarboxylic acids, and fatty acids, as well as cationic surfactants and ester quats obtainable therefrom.

Although there has been developed a variety of corrosion inhibitors to be used in the presence of freshwater, seawater, or brine, there is still a need for more effective corrosion inhibitors, especially if these also can be shown to fulfil stringent regulatory requirements for environmental adaptation. Thus, there is a great need for new corrosion inhibitors with an acceptable biodegradation profile combined with a low disposition to bioaccumulation and an excellent technical performance.

SUMMARY OF THE INVENTION

It is an object of the present invention to at least partially meet the above-mentioned need in the art and to provide a corrosion-inhibiting compound that exhibits high efficacy.

It is another object of the present invention to provide corrosion-inhibiting compounds that have advantageous environmental properties.

The present inventors have found that these objects can be met by certain polyester polyamine or polyester polyquaternary ammonium compounds, obtainable by the condensation of a fatty acid, a dicarboxylic acid or a derivative thereof and an alkoxylated fatty amine, where the condensation product optionally has been quaternised by a suitable alkylating agent.

Thus, in a first aspect, the present invention relates to the use of the aforementioned products as corrosion inhibitors for metal surfaces.

In a second aspect, the present invention relates to a method for protecting a metal surface from corrosion by contacting the metal surface with an effective amount of a corrosion inhibitor as mentioned above.

These and other aspects of the present invention will be apparent from the following detailed description of the invention.

DETAILED DESCRIPTION OF THE INVENTION

The present invention relates to the use of a product obtainable by the condensation of a fatty acid, or mixture of acids, having the formula $R^1COOH$ (I), where $R^1CO$ is an acyl group having 8 to 24, preferably 12 to 24, more preferably 14 to 24, and most preferably 16-24, carbon atoms, that may be saturated or unsaturated, linear or branched; and a dicarboxylic acid or a derivative thereof having the formula (IIa) or (IIb)

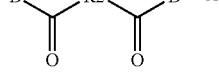
(IIa)

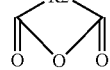
(IIb)

where D is —OH, —Cl, or —$OR^3$, where $R^3$ is a $C_1$-$C_4$ alkyl group; $R^2$ is selected from the group consisting of a direct bond, an alkylene radical of formula —$(CH_2)_z$—, in which z is an integer from 1 to 10, preferably from 2 to 4, and most preferably 4, a substituted alkylene radical wherein said alkylene radical is substituted by 1 or 2-OH groups, a cycloalkylene, a cycloalkenylene and an arylene group;
with an alkoxylated fatty amine having the formula (III)

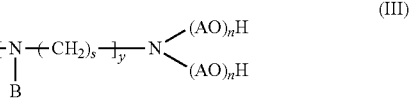
(III)

wherein $R^4$ is a hydrocarbyl group having 8-24 carbon atoms, preferably 12 to 24 carbon atoms; AO is an alkyleneoxy group containing 2-4 carbon atoms, preferably 2 carbon atoms; each B is, independently, an alkyl group having 1-4 carbon atoms, or a benzyl group; each n is, independently, at least 1 and the sum of all n is 2-30, preferably 2-15, more preferably 2-10, and most preferably 2-5; s is 2 or 3; and y is 0 or 1; or of a product obtainable by partial or total quaternisation of the alkoxylated fatty amine of formula (III); optionally said reaction between the fatty acid, the dicarboxylic acid and the alkoxylated fatty amine is being followed by a further reaction step wherein part or all of the nitrogen atoms are quaternised by reaction with an alkylating agent $R^5X$, where $R^5$ is a hydrocarbyl group, preferably a $C_1$-$C_4$ alkyl group or the benzyl group, and $X^-$ is an anion derived from the alkylating agent $R^5X$; as a corrosion inhibitor for metal surfaces.

In an embodiment the alkoxylated fatty amine has the formula

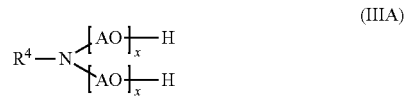
(IIIA)

wherein each x independently is a number between 1 and 5, and Σx on molar average is a number between 2 and 10, AO is an alkyleneoxy group having 2-4, preferably 2, carbon atoms, $R^4$ is a hydrocarbyl group having 8 to 24 carbon atoms, preferably 12 to 24 carbon atoms or a partial or wholly quaternised derivative thereof; optionally said reaction between the fatty acid, the dicarboxylic acid and the alkoxylated fatty amine is being followed by a further reaction step wherein part or all of the nitrogen atoms are quaternised by reaction with an alkylating agent $R^5X$, where $R^5$ is a hydrocarbyl group, preferably a $C_1$-$C_4$ alkyl group or the benzyl group, and $X^-$ is an anion derived from the alkylating agent $R^5X$; as a corrosion inhibitor for metal surfaces.

For the embodiment where the condensation products described above are obtained from the alkoxylated fatty amine having the formula (IIIA), the said products may be represented by the general formula

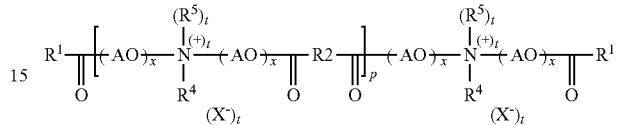
(IV)

where $R^1$, AO, x, R2, and $R^4$ have the same meaning as above; $R^5$ is a hydrocarbyl group, preferably a $C_1$-$C_4$ alkyl group or the benzyl group, and $X^-$ is an anion derived from the alkylating agent $R^5X$; t is a number 0 or 1, preferably 1, and p is typically a number within the range 1-15, and is on average at least 1, preferably at least 2 and most preferably at least 3. The average value of p will depend on the molar ratios of the compounds (I), (IIa) or (IIb) and (III) in the reaction mixture, as well as on the reaction conditions.

It is to be understood that there might be molecules present in the product mixture that are not completely esterified with fatty acids, but the products of formula IV are the key compounds.

Suitable examples of fatty acids of formula (I) are 2-ethylhexanoic acid, n-octanoic acid, n-decanoic acid, n-dodecanoic acid, n-tetradecanoic acid, n-hexadecanoic acid, palmitoleic acid, n-octadecanoic acid, oleic acid, linoleic acid, linolenic acid, eicosanoic acid, docosanoic acid, tetracosanoic acid, coco fatty acid, rape seed fatty acid, soya fatty acid, tallow fatty acid, tall oil fatty acid, gadoleic acid and erucic acid.

The dicarboxylic acid derivative of general formula (IIa) or (IIb) could be a dicarboxylic acid as such, a dicarboxylic acid chloride, a diester of a dicarboxylic acid, or a cyclic anhydride of a dicarboxylic acid. The most suitable derivatives are the dicarboxylic acids and their corresponding cyclic anhydrides. Illustrative examples of dicarboxylic acid derivatives include oxalic acid, malonic acid, succinic acid, glutaric acid, adipic acid, pimelic acid, phthalic acid, tetrahydrophthalic acid, malic acid, tartaric acid, their corresponding acid chlorides, their corresponding methyl or ethyl esters, and their corresponding cyclic anhydrides.

Illustrative examples of suitable fatty amines for use as starting materials for the alkoxylated fatty amines (III) include, but are not limited to, (fatty alkyl) monoamines according to formula $R^4NH_2$, wherein $R^4$ is an aliphatic group having 8-24, preferably 12-24 carbon atoms; and (fatty alkyl) methyl diamines according to formula $R^4N(CH_3)CH_2CH_2CH_2NH_2$. More specific examples of the above-mentioned amines include, but are not limited to, 2-ethylhexyl amine, 2-propylheptyl amine, n-octyl amine, n-decyl amine, n-dodecyl amine, (coco alkyl) amine, n-tetradecyl amine, n-hexadecyl amine, n-octadecyl amine, oleyl amine, (tallow alkyl) amine, (hydrogenated tallow alkyl) amine, (rape seed alkyl) amine, (soya alkyl) amine, erucyl amine, N-(n-decyl)N-methyl-trimethylene diamine, N-(n-dodecyl)-N-methyl-trimethylene diamine, N-(coco alkyl)-N-methyl-trimethylene diamine, N-(rape seed alkyl)-N-methyl-trimethylene diamine, N-(soya alkyl)-N-methyltrimethylene diamine, N-(tallow alkyl)-N-methyl-trimethylene diamine, N-(hydrogenated tallow alkyl)-N-methyl-trimethylene diamine, and N-erucyl-N-methyl trimethylene diamine.

These fatty amines are then typically alkoxylated with 2-20, preferably 2-10 EO (ethyleneoxy units), 2-20, preferably 2-10 PO (propyleneoxy units), 2-20, preferably 2-10 BO (butyleneoxy units), blocks with EO added first and PO and/or BO last, blocks with PO and/or BO added first and EO last, or with mixtures of EO and PO and/or BO to produce randomly alkoxylated products of the general formula (III). The alkoxylation may be performed by any suitable method known in the art by using e.g. an alkaline catalyst, such as KOH, or an acid catalyst.

Examples of commercial products of formula (III) ex AkzoNobel include Ethomeen C/12, Ethomeen C/15, Ethomeen C/25, Ethomeen T/12, Ethomeen T/15, Ethomeen T/20, Ethomeen T/25, Ethomeen HT/12, Ethomeen O/12, Ethomeen OV/12, Ethomeen S/12, Ethomeen S/17, and Ethomeen S/22.

A suitable method for the preparation of the products subject of the present invention comprises the steps of mixing a compound of formula (I) as defined above with a compound of formula (IIa) or (IIb) as defined above and a compound of formula (III) as defined above, effecting an esterification condensation reaction between the compounds in the mixture, and if a quaternary product is desired, adding an alkylating agent to the condensation reaction product and effecting a quaternisation reaction of the condensation product.

The esterification condensation reactions taking place between the compounds (I), (IIa) or (IIb), and (III) are well-known per se in the art. The reactions are preferably being performed in the presence of an esterification catalyst, such as a Brönstedt or Lewis acid, for example methanesulfonic acid, p-toluenesulfonic acid, citric acid or $BF_3$. When a dicarboxylic acid derivative of formula (IIa) is used, wherein D is $O-R^3$, the reaction is a transesterification, which alternatively could be performed in the presence of an alkaline catalyst. Also the carboxylic acid (I) may be added as e.g. its methyl ester. Alternatively, other conventional techniques known by the person skilled in the art could be used starting from other derivatives of the dicarboxylic acids, such as from their anhydrides or their acid chlorides.

As would also be clear to a person skilled in the art, alternatively the different esterification reactions could be performed in more than one step, e.g. by first condensing the dicarboxylic acid derivative (IIa) or (IIb) with the alkoxylated fatty amine (III), and then adding the carboxylic acid (I) in a next step. The reactions could take place with or without solvents added. If solvents are present during the reaction, the solvents should be inert to esterification, e.g. toluene or xylene.

The esterification condensation reaction between the components (I), (IIa) or (IIb), and (III) is suitably effected by heating the mixture at a temperature suitably between 120 and 220° C. for a period of from 2 to 20 hours, optionally at a reduced pressure of from 5 to 200 mbar.

When t in formula (IV) is 0 the product is a tertiary polyesteramine compound, and when t is 1 the product is a polyester polyquaternary ammonium compound. Quaternisation is a reaction type that is well-known in the art. For the quaternisation step, the alkylating agent $R^5X$ is suitably selected from the group consisting of methyl chloride, methyl bromide, dimethyl sulphate, diethyl sulphate, dimethyl carbonate and benzyl chloride, the most preferred alkylating agents being methyl chloride, dimethyl sulphate, dimethyl carbonate or benzyl chloride. As stated above, the quaternisation could suitably be performed on the condensation product between the fatty acid, alkoxylated fatty amine and diacid. Principally, following an alternative synthesis route, the quaternisation of the alkoxylated fatty amine (III) could be performed as a first step, which would then be followed by an esterification reaction between (I), (IIa) or (IIb) and quaternised (III). Either a part of, or all of, the nitrogen atoms may be quaternised. As a further alternative, if a quaternised derivative is desired, a reaction product between the tertiary alkoxylated fatty amine (III) and a dicarboxylic acid derivative (IIa) or (IIb) may be reacted with an alkylating agent, e.g. methyl chloride or dimethyl sulphate, to yield a product that is partly or totally quaternised, before reaction with the carboxylic acid (I). Also, the two processes can be combined such that first a partially quaternised compound is esterified and the resulting polyester is further quaternised.

Quaternisation reactions are normally performed in water or a solvent, such as isopropanol (IPA) or ethanol, or in mixtures thereof. Other alternative solvents could be ethylene glycol monobutyl ether, di(ethylene glycol) monobutyl ether (BDG), and other ethylene- and propylene glycols, such as monoethylene glycol (MEG) and diethylene glycol (DEG). The reaction temperature of the quaternising reaction is suitably in the range of from 20 to 100° C., preferably at least 40, more preferably at least 50 and most preferably at least 55° C., and preferably at most 90° C. The heating is preferably stopped when the amount of basic nitrogen is 0.1 mmol/g, as measured by titration with 0.1 M perchloric acid in glacial acetic acid.

Products of the invention where all nitrogen atoms of the product are quaternary are preferred.

The molar ratio between the fatty acid, or mixture of acids, having the formula $R^1COOH$ (I) and the alkoxylated fatty amine (III) in the reaction mixture is suitably 1:1.2 to 1:10, more preferably 1:1.5 to 1:5, still more preferably 1:2 to 1:4 and most preferably 1:2 to 1:3, and the ratio between the fatty acid (I) and the dicarboxylic acid or derivative (IIa) or (IIb) is suitably 2:1 to 1:8, 1:1 to 1:8, more preferably 1:1.2 to 1:6, still more preferably 1:1.5 to 1:5, still more preferably 1:1.5 to 1:4, still more preferably 1:1.5 to 1:3, and most preferably 1:1.5 to 1:2.5.

In the non-prepublished patent application PCT/EP2010/059325 polymeric products obtainable by the reaction of an alkoxylated fatty amine with a dicarboxylic acid derivative, optionally quaternised, are described. The said products are used for corrosion inhibition, but have a different structure and performance than the products of the present invention.

An example of a polymer of formula (IV) has the structure shown below

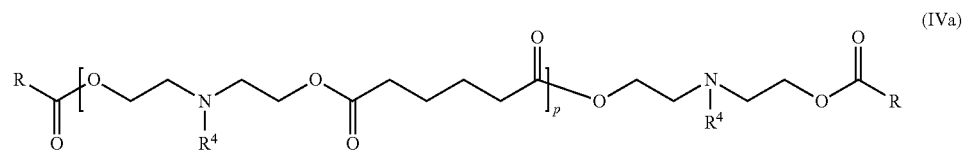

(IVa)

where RC=O is an acyl group having 8-24 carbon atoms, preferably 12 to 24 carbon atoms and p is a number of at least 1, preferably at least 2, and most preferably at least 3; and $R^4$ is a hydrocarbyl group having 8 to 24 carbon atoms.

To produce a product according to the example above, where p is 3, 4 moles of a $C_8$-$C_{24}$ fatty amine that has been ethoxylated with 2 moles of EO is reacted with 2 moles of a $C_8$-$C_{24}$ carboxylic acid and 3 moles of adipic acid.

The products disclosed in the examples in the experimental section possess a polymeric nature and hereinafter, a product obtainable by the above-mentioned condensation and optionally further quaternisation is referred to as a "polymeric esteramine product" or a "polymeric quaternary ammonium ester product" respectively. The polymeric esteramine or polymeric quaternary ammonium ester product of the present invention may be used for protection from corrosion of metal surfaces, preferably ferrous metals or alloys, such as iron and steel, of pipelines, pumps, tanks and other equipment preferably used in oil- and gas fields or refineries in all of the abovementioned situations.

With regard to the use of the polymeric esteramine or polymeric quaternary ammonium ester product as corrosion inhibitor in various flow lines, the fluid content can vary in wide ranges, e.g. oil cuts may vary from 1% in field situations to 100% in e.g. refineries as well as the composition of the possibly co-transported water can vary a lot when it comes to e.g. dissolved solids and salts contents. For example, the vast majority of seawater has a salinity of 3.1-3.8% by weight, being on the average about 3.5% in the world's oceans, but the water in the flow lines, when present, could even have a salt content of up to 7% by weight, e.g. up to 6%, such as up to 4%. On the other hand the water may also be fresh or brackish water with lower salt contents, for example as low as 0.3, even as low as 0.05% and down to 0.01; brackish water may exhibit a large variation from time to time having a salt content of about 0.05% up to about 3%.

Typically, the metal surfaces to be protected are in contact with water of differing salt content, as exemplified above.

In the preferred procedure of this invention, the polymeric esteramine or polymeric quaternary ammonium ester products are added to a flowing liquid which may contain both oil and water, at any point in a flow line upstream of the point or line that is intended to be protected. The dosage of corrosion inhibiting product of the invention needed to obtain a sufficient protection varies with the application, but is suitably dosed in such an amount that the concentration at the point of protection is between 1 and 2000 ppm (by weight), preferably between 1 and 500 ppm and most preferably between 1 and 150 ppm. Even though continuous dosage is the preferred use of the compounds of this invention, another possible mode is batch treatment, where the preferred dosage is between 1 and 5000 ppm.

In addition to the polymeric esteramine or polymeric quaternary ammonium ester products of this invention, other ingredients could also be added to the corrosion inhibiting compositions in order to e.g. improve handling under different climate conditions or to further improve the performance under different conditions. Examples of such ingredients are organic or inorganic acids, such as acetic acid, citric acid and hydrochloric acid, in which case the amines will be predominantly present as salts; a dispersing or cleaning surfactant, such as nonionic ethylene oxide adducts; water-miscible solvents, such as methanol, ethanol, isopropanol, butanol or glycols such as butyl diglycol, ethylene glycol monobutyl ether, monoethylene glycol; scale inhibitors; biocides, such as alkylbenzyldimethyl ammonium chloride, dialkyldimethyl ammonium chloride, alkylamidopropyldimethylamine oxides or quaternary ammonium salts, e.g. alkylbis(hydroxyethyl)methyl quaternary ammonium chloride; and other corrosion inhibitors, such as other amines, amides, imidazolines or amphoterics. In order to further improve the corrosion inhibition efficacy, a synergist such as sodium thiosulfate or 2-mercaptoethanol could be added.

Example 1

Synthesis of Corrosion Inhibitor

Tallow fatty acid (Tefacid 2005-11091 ex Karlshamn; 120.0 g, 0.43 mole), Ethomeen T/12E (370.0 g, 1.07 mole) from AkzoNobel and succinic anhydride (85.6 g, 0.86 mole) from DFS Fine Chemicals were added to a round bottomed flask fitted with a condenser, a thermometer, a heating mantle, a nitrogen inlet and a mechanical stirrer. The reaction mixture was slowly heated to 170° C. Commencing at 156° C., the water produced during the reaction started to distil off. Water removal at atmospheric pressure was continued for 1 h at 156-168° C. Thereafter, vacuum was applied gradually in order to more completely remove the water. In 1 h, the endpoint vacuum of 22 mbar was reached. Water removal under vacuum was continued for additionally 6 h. The progress of the reaction was monitored by titration for acid value as well as by $^1$H-NMR spectroscopy. After the outlined vacuum distillation the acid value of the product was 0.086 meq/g, and the reaction was stopped. 541 g of product was obtained.

Example 2

Corrosion Inhibition Performance in Brine

The tests were carried out using the well-known "bubble test" method, see for instance the discussion in NACE International, Vol. 46, No. 5, pp 46-51 (May 2007), where corrosion rate is monitored by linear polarization resistance (LPR). First a baseline corrosion rate in the medium is established, and then corrosion rates with different amounts of inhibitor added are measured.

The detailed conditions for the tests were as follows:
Temperature 54° C.
$CO_2$ $CO_2$ Saturated at ambient pressure (~0.9 bara partial pressure)
Liquids 100% Typical "Forties" (North Sea water) synthetic brine as shown below:
  Chloride=42539 mg/l
  Sulphate=0 mg/l
  Barium=173 mg/l
  Calcium=1979 mg/l
  Strontium=351 mg/l
  Magnesium=377 mg/l
  Sodium=24973 mg/l
  Potassium=341 mg/l
  Bicarbonate=200 mg/l
Electrode Fabricated from AISI 1018 (UNS G10180), polished to 600 grit finish, degreased rinsed and dried
Inhibitor Concentration 4 hour precorrosion without inhibitor, then dose with 10 ppm of inhibitor and evaluate corrosion rate for at least 8 h, then add inhibitor so that the next level of total inhibitor dosage is reached according to Table 1. After each addition the corrosion rate is measured for at least 8 h.
Gas and partial pressure Ambient pressure test. Maximum partial pressure 1 bara (less saturated water vapour pressure at test temperature).

Corrosion Monitoring LPR±10 mV step perturbation with a 2 minute time constant. A Stearn-Geary constant of 25 mV was used to calculate corrosion rates from LPR data. Corrosion rates were monitored throughout each test with a measurement taken every 30 minutes.

Container 1,000 ml electrochemical test cell

Procedure Prepare solution and purge with $CO_2$ until oxygen is less than 10 ppb. Polish electrodes and place them into the electrochemical test cell under a $N_2$ blanket. Transfer the solution into the test cell under $N_2$ blanket. Control the temperature using a proportional controller. Switch gas supply to the required gas mixture. Monitor the corrosion rate for at least 4 hours. Inject neat inhibitor using a micro pipette and monitor the corrosion rate until stable.

Dosage Dosages given refer to active corrosion inhibitor.

Formulation Product of Example 1 was formulated as follows prior to testing:

30.6% (w/w) product of example 1
8.2% (w/w) glycolic acid (70% in water)
10.2% (w/w) n-BuOH
4.1% (w/w) BDG
Balance water Product of example 1, water, butanol and BDG is mixed followed by addition of glycolic acid yielding a clear, homogenous solution.

The % protection was calculated from the following equation:

$$\% \text{ protection} = (1-(x/y))*100$$

where x=corrosion rate in the presence of corrosion inhibitor (mm/year)
y=corrosion rate in the absence of corrosion inhibitor (mm/year)

The results are given in Table 1.

TABLE 1

| Substance | % Protection at | |
| --- | --- | --- |
| | 31 ppm | 80 ppm |
| Quaternary amine* (comparison) | — | 89.6 |
| Product of Example 1 | 80.0 | — |

*$C_{12}$-$C_{16}$ Cocoalkyl di-methyl benzyl quaternary amine

These figures demonstrate that the product of Example 1 give a substantial corrosion protection under representative conditions also at a low dosage.

Even though not shown in the present example, similar experiments performed earlier, inter alia example 6 in the non-prepublished patent application PCT/EP2010/059325, indicate that the corrosion inhibiting performance of the quaternary amine used as the comparative compound, heavily depends on the concentration. In example 6 of the non-prepublished patent application PCT/EP2010/059325, by using essentially identical testing parameters the % protection at 50 ppm was measured to 38, and at 20 ppm, it was measured to −28.

Example 3

Biodegradability

It is nowadays a well established fact that a reasonable biodegradability often is required by society and authorities for man-made organic compounds that are used in applications where they finally could reach the environment. For certain geographical and/or application areas certain minimum levels of biodegradability are in addition stated by regulatory bodies.

The product synthesized in Example 1 was tested for biodegradability in seawater, following GLP standards, according to OECD Guideline for testing of chemicals, section 3; Degradation and accumulation, No. 306: biodegradability in seawater, Closed Bottle test. The biodegradation after 28 days was >60%. This examples indicate the generally good biodegradability of the compounds according to the invention.

The invention claimed is:

1. A method for protecting a metal surface from corrosion by contacting the metal surface with a product obtainable by the reaction of a fatty acid, or mixture of acids, having the formula $R^1COOH$ (I), where $R^1CO$ is an acyl group having 8 to 24 carbon atoms, that may be saturated or unsaturated, linear or branched; and a dicarboxylic acid or a derivative thereof having the formula (IIa) or (IIb)

$$D\underset{O}{\overset{}{\diagdown}}\overset{R2}{\diagup}\underset{O}{\overset{}{\diagdown}}D \quad \text{or} \quad \text{(IIa)}$$

$$\overset{R2}{\underset{O\ O\ O}{\diagdown\diagup}} \quad \text{(IIb)}$$

where D is —OH, —Cl, or —OR$^3$, where R$^3$ is a $C_1$-$C_4$ alkyl group; R2 is selected from the group consisting of a direct bond, an alkylene radical of formula —(CH$_2$)$_z$—, in which z is an integer from 1 to 10, a substituted alkylene radical wherein said alkylene radical is substituted by 1 or 2 —OH groups, a cycloalkylene, a cycloalkenylene and/or an arylene group;

with an alkoxylated fatty amine having the formula (III)

$$R^4 \text{---}[\text{N---}(CH_2)_s\text{---}]_y\text{---}N \begin{cases} (AO)_nH \\ (AO)_nH \end{cases} \quad \text{(III)}$$
$$\quad\quad\,|\\\quad\quad B$$

wherein R$^4$ is a hydrocarbyl group having 8-24 carbon atoms; AO is an alkyleneoxy group containing 2-4 carbon atoms, each B is, independently, an alkyl group having 1-4 carbon atoms, or a benzyl group; each n is, independently, at least 1 and the sum of all n is 2-30; s is 2 or 3; and y is 0 or 1; or of a product obtainable by partial or total quaternisation of the alkoxylated fatty amine of formula (III).

2. The method according to claim 1 wherein the alkoxylated fatty amine has the formula $$R^4\text{---}N\begin{cases}[AO]_x\text{---}H \\ [AO]_x\text{---}H\end{cases} \quad \text{(IIIA)}$$

wherein each x independently is a number between 1 and 5, and Σx on molar average is a number between 2 and 10, AO is an alkyleneoxy group having 2-4 carbon atoms, $R^4$ is a $C_8$-$C_{24}$ alkyl group, or a partial or wholly quaternised derivative thereof.

3. The method according to claim 2 wherein the product has the formula $$R^1 \left[ \left( AO \right)_x \overset{(R^5)_t}{\underset{\underset{R^4}{|}}{\overset{|(+)_t}{N}}} (AO)_x \underset{O}{\|} R2 \underset{O}{\|} (AO)_x \overset{(R^5)_t}{\underset{\underset{R^4}{|}}{\overset{|(+)_t}{N}}} (AO)_x \underset{O}{\|} \right]_p R^1 \quad (IV)$$
$$(X^-)_t \qquad\qquad (X^-)_t$$

where $R^1$, AO, x, R2, and $R^4$ have the same meaning as in claim 2; $R^5$ is a hydrocarbyl group, and $X^-$ is an anion derived from the alkylating agent $R^5X$; t is a number 0 or 1; and p is a number within the range 1-15, and is on average at least 1.

4. The method according to claim 1, wherein $R^1CO$ is an acyl group having 16 to 24 carbon atoms.

5. The method according to claim 1, wherein R2 is an alkylene radical of formula —$(CH_2)_z$—, in which z is 4.

6. The method according to claim 2 wherein x=1.

7. The method according to claim 3, wherein t=1.

8. The method according to claim 7 wherein $R^5$ is a $C_1$-$C_4$ alkyl group or the benzyl group.

9. The method according to claim 7, wherein the alkylating agent $R^5X$ is chosen from the group consisting of methyl chloride, methyl bromide, dimethyl sulphate, diethyl sulphate, dimethyl carbonate and benzyl chloride.

10. The method according to claim 1, wherein the molar ratio between the fatty acid, or mixture of acids, of structure (I) and the alkoxylated fatty amine (III) in the reaction mixture is 1:1.2 to 1:10, and the molar ratio between the fatty acid, or mixture of acids, of structure (I) and the dicarboxylic acid or derivative (IIa) or (IIb) is 2:1 to 1:8.

11. The method according to claim 1, wherein the metal surfaces are part of pipelines, pumps, tanks and other equipment used in oil and gas fields or oil refineries.

12. The method according to claim 1, wherein the corrosion inhibiting product is added to a flowing liquid at any point in a flow line upstream of the point or line that are intended to be protected.

13. A product obtainable by the reaction of
a fatty acid, or mixture of acids, having the formula $R^1COOH$ (I), where $R^1CO$ is an acyl group having 8 to 24 carbon atoms, that may be saturated or unsaturated, linear or branched; and
a dicarboxylic acid or a derivative thereof having the formula (IIa) or (IIb)

$$\underset{O}{\overset{D}{\|}}\diagdown \underset{}{R2} \diagup \underset{O}{\overset{D}{\|}} \quad \text{or} \quad (IIa)$$

$$\underset{O}{\overset{}{\|}} \underset{O}{\overset{R2}{\diagdown\diagup}} \underset{O}{\overset{}{\|}} \quad (IIb)$$

where D is —OH, —Cl, or —$OR^3$, where $R^3$ is a $C_1$-$C_4$ alkyl group; R2 is selected from the group consisting of a direct bond, an alkylene radical of formula —$(CH_2)_z$—, in which z is an integer from 1 to 10, a substituted alkylene radical wherein said alkylene radical is substituted by 1 or 2 —OH groups, a cycloalkylene, a cycloalkenylene and/or an arylene group;
with an alkoxylated fatty amine having the formula (III)

$$R^4 \!-\!\!\!\underset{\underset{B}{|}}{N}\!\!\!-\!(CH_2)_s\!\!\!-\!\!\!\overset{}{\underset{y}{]}}\!-\!N\!\!<\!\!\!\begin{array}{l}(AO)_nH \\ (AO)_nH\end{array} \quad (III)$$

wherein $R^4$ is a hydrocarbyl group having 8-24 carbon atoms; AO is an alkyleneoxy group containing 2-4 carbon atoms; each B is, independently, an alkyl group having 1-4 carbon atoms, or a benzyl group; each n is, independently, at least 1 and the sum of all n is 2-30; s is 2 or 3; and y is 0 or 1; or a product obtainable by partial or total quaternisation of the alkoxylated fatty amine of formula (III).

14. A method for producing the product of claim 13 by reacting a compound having formula (I) and (IIa) or (IIb) with (III).

15. The product according to claim 13 wherein the alkoxylated fatty amine has the formula $$R^4\!-\!N\!\!<\!\!\!\begin{array}{l}\{AO\}_x\!\!-\!H \\ \{AO\}_x\!\!-\!H\end{array} \quad (IIIA)$$

wherein each x independently is a number between 1 and 5, and $\Sigma x$ on molar average is a number between 2 and 10, AO is an alkyleneoxy group having 2-4 carbon atoms, $R^4$ is a $C_8$-$C_{24}$ alkyl group, or a partial or wholly quaternised derivative thereof.

16. The product according to claim 15 wherein the product has the formula $$R^1 \left[ \left( AO \right)_x \overset{(R^5)_t}{\underset{\underset{R^4}{|}}{\overset{|(+)_t}{N}}} (AO)_x \underset{O}{\|} R2 \underset{O}{\|} (AO)_x \overset{(R^5)_t}{\underset{\underset{R^4}{|}}{\overset{|(+)_t}{N}}} (AO)_x \underset{O}{\|} \right]_p R^1 \quad (IV)$$
$$(X^-)_t \qquad\qquad (X^-)_t$$

where $R^1$, AO, x, R2, and $R^4$ have the same meaning as in claim 2; $R^5$ is a hydrocarbyl group, and $X^-$ is an anion derived from the alkylating agent $R^5X$; t is a number 0 or 1; and p is a number within the range 1-15, and is on average at least 1.

17. The product according to claim 13, wherein $R^1CO$ is an acyl group having 16 to 24 carbon atoms.

18. The product according to claim 13, wherein R2 is an alkylene radical of formula —$(CH_2)_z$—, in which z is 4.

19. The product according to claim 15 wherein x=1.

20. The product according to claim 16, wherein t=1.

21. The product according to claim 20 wherein $R^5$ is a $C_1$-$C_4$ alkyl group or the benzyl group.

22. The product according to claim 20, wherein the alkylating agent $R^5X$ is chosen from the group consisting of methyl chloride, methyl bromide, dimethyl sulphate, diethyl sulphate, dimethyl carbonate and benzyl chloride.

23. The product according to claim 13, wherein the molar ratio between the fatty acid, or mixture of acids, of structure (I) and the alkoxylated fatty amine (III) in the reaction mixture is 1:1.2 to 1:10, and the molar ratio between the fatty acid, or mixture of acids, of structure (I) and the dicarboxylic acid or derivative (IIa) or (IIb) is 2:1 to 1:8.

24. The method of claim 1 wherein the reaction between the fatty acid, the dicarboxylic acid and the alkoxylated fatty amine is followed by a further reaction step wherein part or all of the nitrogen atoms are quaternised by reaction with an alkylating agent $R^5X$, where $R^5$ is a hydrocarbyl group, and $X^-$ is an anion derived from the alkylating agent $R^5X$.

25. The method of claim 2 wherein the reaction between the fatty acid, the dicarboxylic acid and the alkoxylated fatty amine is followed by a further reaction step wherein part or all of the nitrogen atoms are quaternised by reaction with an alkylating agent $R^5X$, where $R^5$ is a hydrocarbyl group, and $X^-$ is an anion derived from the alkylating agent R5X.

26. The product of claim 13 obtainable by the reaction wherein the reaction between the fatty acid, the dicarboxylic acid and the alkoxylated fatty amine is followed by a further reaction step wherein part or all of the nitrogen atoms are quaternised by reaction with an alkylating agent $R^5X$, where $R^5$ is a hydrocarbyl group, and $X^-$ is an anion derived from the alkylating agent $R^5X$.

27. The method of claim 14 further comprising reacting the product obtained by reacting a compound having formula (I) and (IIa) or (IIb) with (III)-with an alkylating agent $R^5X$, where $R^4$ is a hydrocarbyl group and $X^-$ is an anion derived from the alkylating agent $R^5X$.

28. The product of claim 15 obtainable by the reaction wherein the reaction between the fatty acid, the dicarboxylic acid and the alkoxylated fatty amine is followed by a further reaction step wherein part or all of the nitrogen atoms are quaternised by reaction with an alkylating agent $R^5X$, where $R^5$ is a hydrocarbyl group, and $X^-$ is an anion derived from the alkylating agent R5X.

* * * * *